United States Patent
Caldwell

(10) Patent No.: US 11,288,359 B1
(45) Date of Patent: Mar. 29, 2022

(54) AUTOMATIC ACCOUNT PROTECTION

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 353 days.

(21) Appl. No.: 16/430,418

(22) Filed: Jun. 3, 2019

Related U.S. Application Data

(63) Continuation-in-part of application No. 15/365,941, filed on Nov. 30, 2016, now Pat. No. 10,313,342.

(60) Provisional application No. 62/261,028, filed on Nov. 30, 2015.

(51) Int. Cl.
| | |
|---|---|
| *H04L 29/06* | (2006.01) |
| *G06F 21/46* | (2013.01) |
| *G06Q 20/34* | (2012.01) |

(52) U.S. Cl.
CPC ............ *G06F 21/46* (2013.01); *G06Q 20/354* (2013.01); *H04L 63/08* (2013.01); *H04L 63/102* (2013.01); *H04L 63/20* (2013.01); *H04L 2463/082* (2013.01)

(58) Field of Classification Search
CPC ....... G06F 21/46; G06Q 20/354; H04L 63/08; H04L 63/20; H04L 63/102; H04L 2463/082
See application file for complete search history.

(56) References Cited

U.S. PATENT DOCUMENTS

| | | | |
|---|---|---|---|
| 7,552,190 B1 | 6/2009 | Freishtat et al. | |
| 7,664,834 B2 | 2/2010 | Keith, Jr. | |
| 7,673,327 B1 | 2/2010 | Polis et al. | |
| 7,912,976 B2 | 3/2011 | Guthrie et al. | |
| 7,961,635 B2 | 6/2011 | Werner et al. | |
| 8,086,528 B2 | 12/2011 | Barrett | |
| 8,122,145 B2 | 2/2012 | Muhonen et al. | |
| 8,250,040 B2 | 8/2012 | Murphy et al. | |
| 8,505,085 B2 | 8/2013 | Logan et al. | |
| 9,077,747 B1* | 7/2015 | Chen ................ | H04L 63/1433 |

(Continued)

FOREIGN PATENT DOCUMENTS

| | | |
|---|---|---|
| CN | 108475249 B | 1/2020 |
| JP | 2010-277527 | 12/2010 |

(Continued)

OTHER PUBLICATIONS

Japan Application No. 2019-171239, Notice of Allowance, dated Feb. 25, 2020, pp. 1-3.

(Continued)

*Primary Examiner* — Baotran N To
(74) *Attorney, Agent, or Firm* — Kunzler Bean & Adamson, PC

(57) ABSTRACT

Apparatuses, systems, methods, and computer program products are disclosed for automatic account protection. A method includes detecting a trigger indicating one or more of a potential and an actual security breach at one or more websites where a user has an account that is accessible using electronic credentials. A method includes logging into the one or more websites for the user using the electronic credentials. A method includes performing one or more actions at the one or more websites associated with the electronic credentials to protect the user's account.

20 Claims, 8 Drawing Sheets

(56) References Cited

U.S. PATENT DOCUMENTS

| | | | |
|---|---|---|---|
| 9,413,556 | B2 | 8/2016 | North Wood et al. |
| 9,432,334 | B2 | 8/2016 | Walters et al. |
| 9,519,777 | B2 | 12/2016 | Brown et al. |
| 9,692,815 | B2 | 6/2017 | Caldwell |
| 9,934,299 | B2 | 4/2018 | Prabhu et al. |
| 10,225,333 | B2 | 3/2019 | Hiroshi |
| 10,354,320 | B2 | 7/2019 | Caldwell |
| 10,367,800 | B2 | 7/2019 | Caldwell |
| 10,499,339 | B2 | 7/2019 | Luna et al. |
| 10,313,342 | B1 | 10/2019 | Caldwell |
| 10,785,724 | B1 | 6/2020 | Luna et al. |
| 10,856,231 | B2 | 12/2020 | Luna et al. |
| 10,904,235 | B2 | 1/2021 | Caldwell |
| 11,005,832 | B2 | 5/2021 | Caldwell |
| 11,005,833 | B2 | 5/2021 | Caldwell |
| 11,190,500 | B2 | 11/2021 | Caldwell |
| 11,233,789 | B1 | 1/2022 | Caldwell |
| 2003/0233361 | A1 | 12/2003 | Cady |
| 2005/0256926 | A1 | 11/2005 | Muhonen et al. |
| 2007/0274227 | A1 | 11/2007 | Rauscher et al. |
| 2008/0040265 | A1* | 2/2008 | Rackley, III ........... G06Q 20/32 705/40 |
| 2008/0244083 | A1 | 10/2008 | Guthrie et al. |
| 2008/0301037 | A1 | 12/2008 | Monk |
| 2009/0319954 | A1 | 12/2009 | Gu et al. |
| 2010/0094612 | A1 | 4/2010 | Weerasinghe |
| 2010/0024040 | A1 | 9/2010 | Rajendran et al. |
| 2010/0318575 | A1 | 12/2010 | Murphy et al. |
| 2011/0158228 | A1 | 6/2011 | Dowling et al. |
| 2011/0138015 | A1 | 9/2011 | Adriazola |
| 2011/0256889 | A1 | 10/2011 | Polis et al. |
| 2011/0277009 | A1 | 11/2011 | Damola et al. |
| 2012/0005041 | A1 | 1/2012 | Mehta et al. |
| 2012/0030471 | A1 | 2/2012 | Li et al. |
| 2012/0203698 | A1* | 8/2012 | Duncan ................. G06Q 20/34 705/44 |
| 2013/0124640 | A1 | 5/2013 | Franco et al. |
| 2013/0254857 | A1* | 9/2013 | Bajenov ............... H04L 63/083 726/7 |
| 2014/0095389 | A1 | 4/2014 | Caldwell |
| 2014/0161033 | A1 | 6/2014 | Dowling et al. |
| 2014/0310792 | A1 | 10/2014 | Hyland et al. |
| 2014/0324980 | A1 | 10/2014 | Appelman et al. |
| 2015/0074715 | A1 | 3/2015 | Berger et al. |
| 2015/0112969 | A1 | 4/2015 | Prabhu et al. |
| 2015/0134817 | A1 | 5/2015 | Edwards |
| 2015/0134831 | A1 | 5/2015 | Hiroishi |
| 2015/0188909 | A1 | 7/2015 | Hyland et al. |
| 2016/0156592 | A1 | 6/2016 | Walters et al. |
| 2016/0328690 | A1* | 11/2016 | Atwal ................. G06Q 20/145 |
| 2016/0337340 | A1 | 11/2016 | Walters et al. |
| 2017/0011213 | A1* | 1/2017 | Cavanagh ............. G06F 21/31 |
| 2017/0011214 | A1* | 1/2017 | Cavanagh ............. H04L 63/06 |
| 2017/0093828 | A1* | 3/2017 | Lupien .................. H04L 67/02 |
| 2017/0323273 | A1 | 11/2017 | Meek et al. |
| 2018/0027001 | A1* | 1/2018 | Park .................. H04L 63/1433 726/23 |
| 2018/0337965 | A1 | 11/2018 | Appelman et al. |
| 2019/0005104 | A1 | 1/2019 | Prabhu et al. |
| 2019/0356643 | A1 | 11/2019 | Caldwell |
| 2020/0029279 | A1 | 1/2020 | Luna et al. |
| 2020/0067899 | A1 | 2/2020 | Caldwell |
| 2020/0067900 | A1 | 2/2020 | Caldwell |
| 2020/0106759 | A1 | 4/2020 | Caldwell |
| 2020/0112553 | A1 | 4/2020 | Caldwell |
| 2020/0314759 | A1 | 6/2020 | Luna et al. |
| 2021/0007055 | A1 | 1/2021 | Luna et al. |

FOREIGN PATENT DOCUMENTS

| | | |
|---|---|---|
| JP | 2011-118789 | 6/2011 |
| JP | 2012-185615 A | 9/2012 |
| JP | 6682689 B2 | 4/2020 |

OTHER PUBLICATIONS

JP Patent Application No. 2018-524464 Office Action dated Jul. 11, 2019.

JP Patent Application No. 2018-524464 Notice of Allowance dated Aug. 28, 2019.

CN Patent Application No. 2016800778918 Office Action dated Mar. 12, 2019.

CN Patent Application No. 2016800778918 Second Office Action dated Sep. 4, 2019.

JP Patent Application No. 2019-171239, Office Action-Notice of Reasons for Rejection, dated Jan. 20, 2020, pp. 1-2.

U.S. Appl. No. 16/525,536 Notice of Allowance and Fees Due, dated Sep. 16, 2020.

U.S. Appl. No. 16/670,834 Office Action, dated Sep. 16, 2020.

U.S. Appl. No. 16/670,838 Office Action, dated Sep. 17, 2020.

U.S. Appl. No. 16/670,834 Notice of Allowance and Fees Due, dated Jan. 13, 2021.

U.S. Appl. No. 16/670,838 Notice of Allowance and Fees Due, dated Jan. 14, 2021.

U.S. Appl. No. 16/701,114 Notice of Allowance and Fees Due, dated Mar. 3, 2021.

U.S. Appl. No. 16/701,116 Office Action, dated Mar. 18, 2021.

U.S. Appl. No. 16/430,412 Office Action, dated May 12, 2021.

U.S. Appl. No. 16/701,114 Notice of Allowance and Fees Due, dated Jun. 18, 2021.

JP Patent Application 2020-053909 Office Action, dated Mar. 19, 2021.

IN Patent Application 201817017217 Examination Report, dated Dec. 30, 2020.

BR Patent Application 112018009431-5 Preliminary Report, dated Jul. 7, 2020.

U.S. Appl. No. 16/701,116 Notice of Allowance, dated Jul. 22, 2021.

JP Patent Application 2020-053909 Notice of Allowance, dated Jan. 20, 2022.

EP Patent Application 21205723.6 Search Report, dated Feb. 4, 2022.

EP Patent Application 21205725.1 Search Report, dated Feb. 11, 2022.

* cited by examiner

AUTOMATIC ACCOUNT PROTECTION

CROSS-REFERENCES TO RELATED APPLICATIONS

This is a continuation-in-part application of and claims priority to U.S. patent application Ser. No. 15/365,941 entitled "AUTOMATIC EVENT MIGRATION" and filed on Nov. 30, 2016, for John Ryan Caldwell, which claims the benefit of U.S. Provisional Patent Application No. 62/261,028 entitled "AUTOMATIC PAYMENT AND DEPOSIT MIGRATION" and filed on Nov. 30, 2015, for John Ryan Caldwell, both of which are incorporated herein by reference in their entirety for all purposes.

FIELD

This invention relates to detecting security breaches and more particularly relates to automatically protecting user accounts affected by a security breach.

BACKGROUND

Detecting security breaches and misappropriation of user data is important to be able to take steps to mitigate the damages and prevent further unauthorized access of user accounts. A user may have numerous user accounts that can be affected by a security breach, which makes it tedious for the user to manually change account settings at each account where a breach is detected.

SUMMARY

Methods are presented for automatic account protection. In one embodiment, a method includes detecting a trigger indicating one or more of a potential and an actual security breach at one or more websites where a user has an account that is accessible using electronic credentials. A method, in certain embodiments, includes logging into the one or more websites for the user using the electronic credentials. A method, in one embodiment, includes performing one or more actions at the one or more websites associated with the electronic credentials to protect the user's account.

Apparatuses are presented for automatic account protection. An apparatus, in one embodiment, includes a breach module that detects a trigger indicating one or more of a potential and an actual security breach at one or more websites where a user has an account that is accessible using electronic credentials. In one embodiment, an apparatus includes an access module that logs into the one or more websites for the user using the electronic credentials. An apparatus, in some embodiments, includes an action module that performs one or more actions at the one or more websites associated with the electronic credentials to protect the user's account.

Computer program products are presented for automatic account protection. A computer program product includes a computer readable storage medium storing computer usable program code executable to perform operations. In one embodiment, operations include detecting a trigger indicating one or more of a potential and an actual security breach at one or more websites where a user has an account that is accessible using electronic credentials. In further embodiments, operations include logging into the one or more websites for the user using the electronic credentials. In some embodiments, operations include performing one or more actions at the one or more websites associated with the electronic credentials to protect the user's account.

An apparatus, in another embodiment, includes means for performing the various steps and operations described with regard to the disclosed methods, apparatuses, and computer program products. A system, in certain embodiments, includes various devices, elements, modules, components, and/or the like for performing the various steps and operations described with regard to the disclosed methods, apparatuses, and computer program products.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
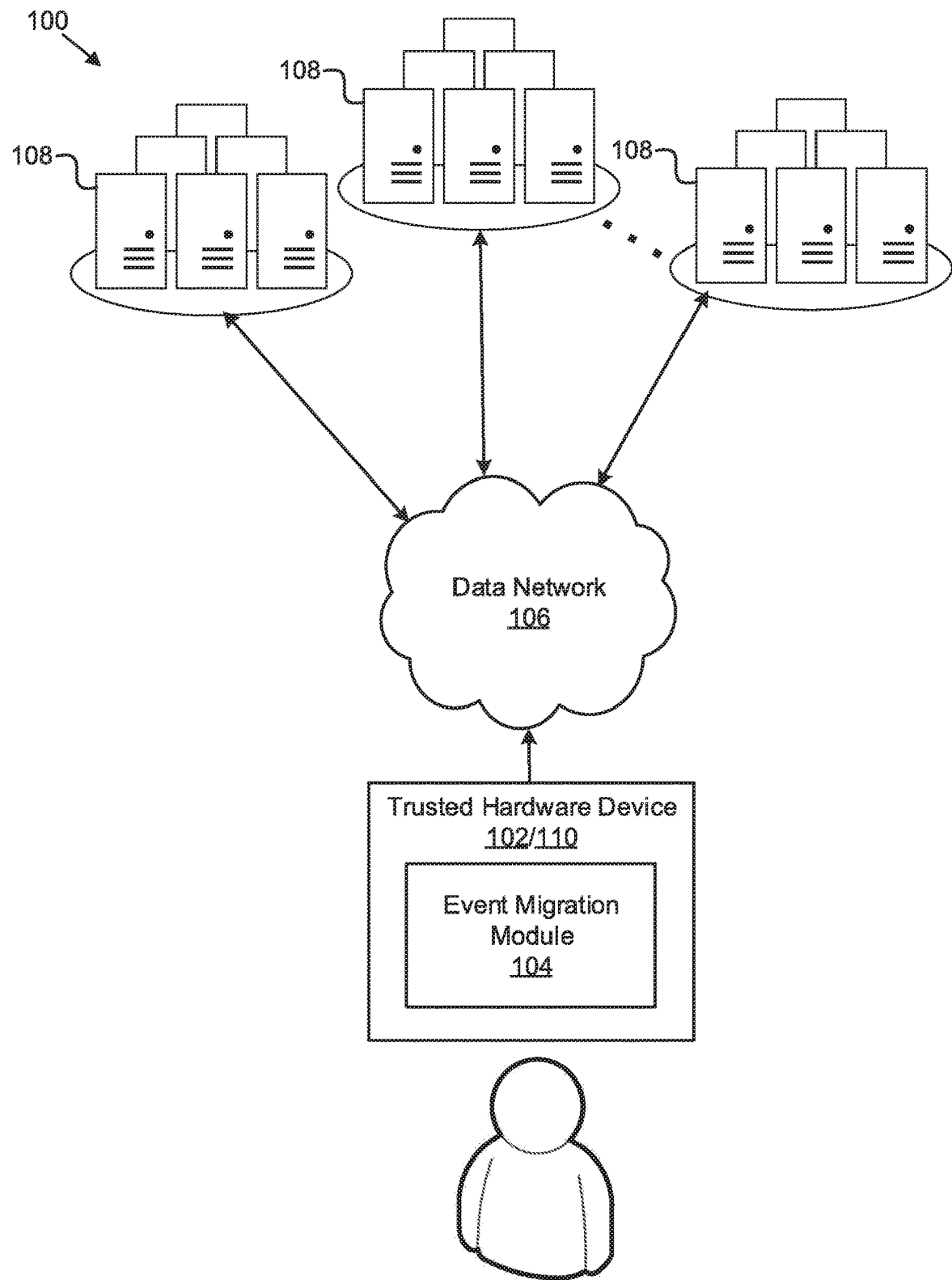
FIG. 1A is a schematic block diagram illustrating one embodiment of a system for automatic account protection.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (e.g., including firmware, resident software, micro-code, etc. stored on a non-transitory computer readable storage medium) or an embodiment combining software and hardware aspects that may all generally be referred to herein as a "circuit," "module," or "system." Furthermore, aspects of the present invention may take the form of a computer program product embodied in one or more non-transitory computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays (e.g., an application specific integrated circuit), off-the-shelf semiconductors such as logic chips, transistors, and/or other discrete components. A module may also be implemented in one or more programmable hardware devices such as field programmable gate arrays, programmable array logic, programmable logic devices, or the like.

Modules may also be implemented at least partially in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more non-transitory computer readable storage media. A computer program product may include a non-transitory computer readable storage medium (or media) storing computer readable program instructions thereon for causing a processor to carry out aspects of the present invention.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM"), a semiconductor memory device (e.g., NAND Flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), or the like), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, script instructions, machine dependent instructions, microcode, firmware instructions, state-setting data, or either source code or object code written in any combination of one or more programming languages, including an object oriented programming language such as Smalltalk, C++, Java, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1B:
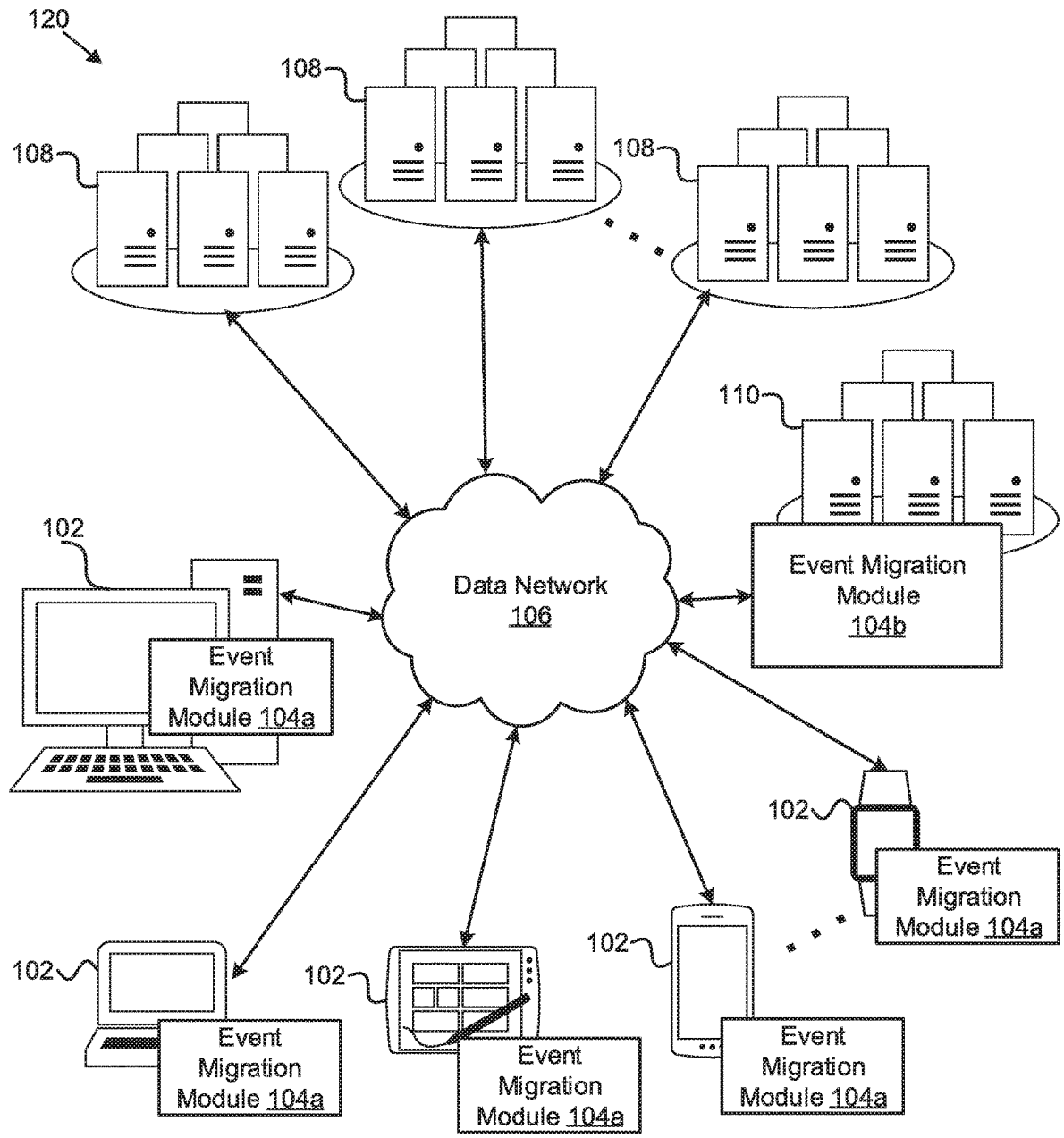
FIG. 1B is a schematic block diagram illustrating one embodiment of another system for automatic account protection.

FIG. 1A depicts one embodiment of a system 100 for automated event migration. FIG. 1B depicts another embodiment of a system 120 for automated event migration. In one embodiment, the system 120 includes one or more hardware devices 102, one or more event migration modules 104 (e.g., a backend event migration module 104b and/or a plurality of event migration modules 104a disposed on the one or more hardware devices 102), one or more data networks 106 or other communication channels, one or more service providers 108 (e.g., one or more servers 108 of one or more service providers 108; one or more cloud or network service providers 108; one or more aggregation servers 108; or the like), and/or one or more backend servers 110.

In certain embodiments, even though a specific number of hardware devices 102, event migration modules 104, data networks 106, service providers 108, and/or backend servers 110 are depicted in FIG. 1B, one of skill in the art will recognize, in light of this disclosure, that any number of hardware devices 102, event migration modules 104, data networks 106, service providers 108, and/or backend servers 110 may be included in the system 100 for event migration. For example, FIG. 1A depicts a single trusted hardware device 102 and/or 110 comprising a single event migration module 104 in communication with one or more servers 108 over a data network 106.

In one embodiment, the system 100 and/or 120 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more service providers 108 (e.g., third party servers 108 and/or third party service providers 108) and/or one or more backend servers 110 (e.g., first party servers 110 of a first party service provider 108, of an event migration module 104b, or the like) via a data network 106, described below. The one or more hardware devices 102, in a further embodiment, are capable of executing various programs, program code, applications, instructions, functions, or the like.

In one embodiment, an event migration module 104 is configured to switch, migrate, and/or transfer execution of one or more events between service providers 108. An event migration module 104 may identify an event to migrate by processing aggregated data (e.g., an aggregated set of events) from one or more servers 108 (e.g., downloaded from one or more third party service providers 108, from one or more first party service providers 108 associated with the backend server 110, from one or more aggregation servers 108, and/or the like). An event migration module 104 may identify one or more repeating events from a set of events, prompt a user to migrate one or more repeating events from one service provider 108 to a different service provider 108, and/or migrate one or more repeating events to a different service provider 108, or the like.

Many users may desire to switch service providers 108. However, service providers 108 may make the process difficult, or users may not want to go through the headache of making the switch, even if a different service provider 108 provides better features, quality, price, or another attribute than a current service provider 108. An event migration module 104, in certain embodiments, identifies repeating events associated with a service provider 108, and provides an interface allowing a user to switch or migrate the event to a different service provider 108 (e.g., a different software as a service (SaaS) provider; a different data repository; a different social network; a different payment source such as a debit card, credit card, financial account, online payment system account, or the like; a different entity and/or institution; or the like).

An event migration module 104 may comprise and/or be part of a trusted hardware device 102, 110, which is secure and authorized by a user to store and/or use one or more of the user's electronic credentials or other important data. An event migration module 104 may be provided by a government entity, an educational institution, a financial institution, and/or another entity which the user trusts and/or authorizes to act in its behalf. For example, an event migration module 104 may be provided by a service provider 108 associated with the backend server 110, allowing users to migrate and/or switch one or more events from other third party service providers 108 to the first party service provider 108 providing the event migration module 104 (e.g., a social network 108's application or website may provide an event migration module 104 as a browser plugin, a mobile application, installable software, or the like that prompts a user to migrate and/or switch a social media post to the social network, in response to identifying repeated posts to a different social network; a financial institution 108's mobile application and/or website may prompt a user to switch one or more repeating payments from a credit card, debit card, checking account, savings account, or other financial account of a competitor 108 to a credit card, debit card, checking account, savings account, or other financial account of the financial institution 108; an operating system for a hardware device 102 may comprise an event migration module 104 that identifies repeating antivirus scans, data backups, or other events, and may prompt a user to migrate and/or switch the identified events from a third party service provider 108 to a service provider 108 associated with the operating system; or the like).

In this manner, one or more event migration modules 104 may automate and/or simplify the migration of events from one service provider 108 to a different service provider 108, with minimal interaction with a user (e.g., accepting a prompt, providing and/or authorizing use of electronic credentials, or the like), rather than requiring a user to contact a service provider 108 to manually migrate or transfer execution of an event.

An event, as used herein, may comprise a detected and/or recorded electronic occurrence or the like associated with a user, a user's hardware device 102, a user's account, or the like. An event, in various embodiments, may occur on and/or may be detected and/or recorded by an event migration module 104, a service provider 108, a backend server 110, a hardware device 102 of a user, one or more sensors, or the like. For example, in various embodiments, an event may comprise one or more of a data backup event for a hardware device 102 of a user over a data network 106 (e.g., to a service provider 108), an antivirus and/or security scan event for a hardware device 102 of a user (e.g., periodically scanning files and/or data storage of a hardware device 102 to locate one or more viruses, malware, bots, worms, rootkits, and/or other security risks using software and/or definitions provided by one or more service providers 108), a software and/or firmware update event for a hardware device 102 of a user (e.g., an operating system update, a software patch, an application update, and/or another update downloaded and/or installed from a service provider 108 over a data network 106), an electronic subscription event for a data network service (e.g., a renewal, a payment, or the like), an electronic transaction event (e.g., a credit or debit card payment, a direct deposit, an electronic bill payment, an automated clearing house (ACH) payment, an online and/or electronic money transfer, a mobile and/or wireless payment, or the like to a website, merchant, vendor, individual, and/or other entity), or the like.

A subscription event may include renewing a subscription, paying for a subscription, or the like. A data network service may comprise a digital and/or electronic service that may occur over and/or using a data network 106, such as a cloud software and/or software as a service (SaaS) subscription, a streaming and/or downloadable media subscription (e.g., video, audio, e-books, or the like), an internet service subscription, a cable television subscription, a subscription made over a data network 106 for delivery of digital and/or physical goods and/or services, or the like.

A repeating event may comprise an event that occurs more than once. Different occurrences of a repeating event, in certain embodiments, may comprise at least one attribute in common (e.g., and/or may have one or more attributes that are different). For example, different occurrences of a repeating event may be associated with the same service provider 108, website, and/or other entity; may occur on or around the same time, periodically (e.g., at or around the same time each day; on the same day and/or within a few days each week, month, quarter, year, or other time period; or the like); may be associated with the same or similar (e.g., within a predefined percentage or amount) transaction amount; and/or have one or more other similarities. An event migration module 104 may be configured to select one or more repeating events having at least a threshold number of similarities, may only select one or more repeating events having one or more required similarities, or the like. In one embodiment, an event migration module 104 may provide an interface (e.g., a graphical user interface (GUI), an application programming interface (API), a command line interface (CLI), and/or another interface) allowing a user (e.g., an end user on a hardware device 102, an administrator of a backend server 110, or the like) to select or otherwise define one or more rules for the event migration module 104 to identify one or more repeating events, such as a rule defining a threshold number of similarities for a repeated event, a rule requiring one or more similarities for a repeated event, a rule allowing one or more differences for a repeated event, or the like.

In certain embodiments, a recurring event is a type of repeated event with one or more predefined similarities, such as a repeated event that occurs on or around the same time during each of a plurality of time periods (e.g., at or around the same time each day; on the same day and/or within a few days each week, month, quarter, year, or other time period; or the like) and/or is associated with the same or similar (e.g., within a predefined percentage or amount) transaction amount, or the like. In one embodiment, an event migration module 104 may be configured to identify any repeating event (e.g., including recurring and non-recurring events/transactions). In a further embodiment, an event migration module 104 may be configured to identify only recurring events/transactions.

An event migration module 104, in one embodiment, may download, aggregate, and/or otherwise collect or receive a set of events (e.g., a log, a listing, a history, a file, a data structure, and/or another record of one or more events), in which the event migration module 104 may identify one or more repeating events or the like for migrating and/or switching. For example, an event migration module 104 may aggregate events comprising a user's posts to one or more social media networks 108, may aggregate system and/or application logs from one or more hardware devices 102, may aggregate events from one or more electronic calendar or scheduling services 108, may aggregate images from one or more image sharing and/or backup services 108, may aggregate financial transactions from one or more financial institutions 108, may aggregate online orders from one or more e-commerce services 108, and/or may aggregate a set of events from one or more servers 102, 108, 110.

An event migration module 104, in one embodiment, may download and/or aggregate a set of events directly from one or more servers 108 of one or more service providers 108 (e.g., using a user's electronic credentials for a specific service provider 108 to access an API, CLI, web interface by web crawling and/or screen scraping, or the like). In a further embodiment, an event migration module 104 may download and/or aggregate a set of event from one or more intermediaries, such as an aggregation server 108 that provides access to event data from one or more other service providers 108 (e.g., an event migration module 104 may provide a user's electronic credentials to an aggregation server 108 or other intermediary which may have access to multiple other service providers 108 and may provide event data from one or more of the other service providers 108 to the event migration module 104). In light of this specification, one of skill in the art will recognize many sources which an event migration module 104 may use to aggregate a set of events from one or more servers 108 to a trusted device 102, 110.

For example, in one embodiment, an event migration module 104*b* is disposed on a backend server 110, and may aggregate sets of events for a plurality of different users (e.g., using and/or associated with different hardware devices 102 and/or event migration modules 104*a*) at a central location comprising the backend server 110. In a further embodiment, a distributed and/or decentralized array of multiple event migration modules 104*a* may each download and/or aggregate a set of events for individual users on the users' own hardware devices 102.

An event migration module 104, in certain embodiments, may determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more service providers 108. An event migration module 104, in certain embodiments, accesses a server 108 of a service provider 108 using a user's electronic credentials to download event data associated with the user from the server 108, such as a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). An event migration module 104, in various embodiments, may provide the downloaded data to the user locally (e.g., displaying the data on an electronic display of a hardware device 102); may provide the downloaded data from the hardware device 102 of the user to and/or package the data for a remote server 110 (e.g., a backend event migration module 104*b*) or other remote device (e.g., another hardware device 102 of the user, a hardware device 102 of a different user, or the like) which may be unaffiliated with the third party service provider 108; may provide one or more prompts, alerts, messages, advertisements, or other communications to the user (e.g., on a hardware device 102) based on the downloaded data; or the like.

In certain embodiments, the system 100 and/or 120 includes a plurality of event migration modules 104 disposed/located on hardware devices 102 of a plurality of different users (e.g., comprising hardware of and/or executable code running on one or more hardware devices 102). The plurality of event migration modules 104 may act as a distributed and/or decentralized system 100, executing across multiple hardware devices 102, which are geographically dispersed and using different IP addresses, each downloading and/or aggregating event data (e.g., photos, social media posts, medical records, financial transaction records, other financial data, and/or other user data) separately, in a distributed and/or decentralized manner. While a third party service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many event migration modules 104, in certain embodiments, may be much more difficult for a third party service provider 108 to block.

In one embodiment, a hardware device 102 may include and/or execute an internet browser, which a user may use to access a server 108 of a service provider 108 (e.g., by loading a webpage of the third party service provider 108 in the internet browser). At least a portion of an event migration module 104, in certain embodiments, may comprise a plugin to and/or an extension of an internet browser of a user's personal hardware device 102; so that the event migration module 104 may monitor and/or aggregate events associated with the browser; so that a third party service provider 108 may not block the event migration module 104 from accessing the server 108 of the third party service provider 108 without also blocking the user's own access to the server 108 using the internet browser; or the like. For example, an event migration module 104 may use the same cookies, IP address, saved credentials, or the like as a user would when accessing a server 108 of a third party service provider 108 through the internet browser. In certain embodiments, an event migration module 104 may support integration with multiple different types of internet browsers (e.g., on different hardware devices 102).

An event migration module 104, in certain embodiments, may mimic or copy a user's behavioral pattern in accessing a server 108 of a third party service provider 108, to reduce a likelihood that the third party service provider 108 may distinguish access to the server 108 by an event migration module 104 from access to the server 108 by a user. For example, an event migration module 104 may visit one or more locations (e.g., webpages) of a server 108 of a third party service provider 108, even if the event migration module 104 does not intend to download data from each of the one or more locations, may wait for a certain delay time between accessing different locations, may use a certain scroll pattern, or the like, to mask the event migration module 104's downloading and/or aggregating of a user's data, to reduce the chances of being detected and/or blocked by the third party service provider 108.

In one embodiment, at least a portion of an event migration module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use event data the event migration module 104 downloads from a server 108 of a third party service provider 108, which may generate event data for the event migration module 104, or the like.

In one embodiment, the event migration modules 104a comprise a distributed system 100, with the event migration modules 104a and/or the associated hardware devices 102 downloading and/or aggregating event data substantially independently (e.g., downloading data concurrently or non-concurrently, without a global clock, with independent success and/or failure of components). Distributed event migration modules 104a may pass messages to each other and/or to a backend event migration module 104b, to coordinate their distributed aggregation of event data for users, to migrate identified events to different service providers 108. In one embodiment, the event migration modules 104a are decentralized (e.g., hardware devices 102 associated with users perform one or more aggregation functions such as downloading event data), rather than relying exclusively on a centralized server or other device to perform one or more aggregation functions. In another embodiment, a centralized backend server 110 (e.g., a backend event migration module 104b) downloads event data and/or performs one or more aggregation functions for a plurality of users and/or user hardware devices 102 (e.g., comprising and/or executing frontend event migration modules 104a) using a centralized, non-distributed approach (e.g., with a plurality of frontend event migration modules 104a providing an interface on the hardware devices 102 of the users to access functions provided by the backend event migration module 104b, or the like).

In a distributed and/or decentralized system 100, a central entity, such as a backend event migration module 104b and/or a backend server 110, in certain embodiments, may still provide, to one or more event migration modules 104a, one or more messages comprising instructions for accessing a server 108 of a service provider 108 using a user's electronic credentials, instructions for migrating and/or switching one or more repeating events to a different service provider 108, or the like. For example, a backend event migration module 104b may provide one or more event migration modules 104a of one or more hardware devices 102 with one or more sets of instructions for accessing a server 108 of a service provider 108, such as a location for entering a user's electronic credentials (e.g., a text box, a field, a label, a coordinate, or the like), an instruction for submitting a user's electronic credentials (e.g., a button to press, a link to click, or the like), one or more locations of event data associated with a user (e.g., a row in a table or chart, a column in a table or chart, a uniform resource locator (URL) or other address, a coordinate, a label, or the like), a location for entering information associated with a different service provider 108 (e.g., a text box, a field, a label, a coordinate, or the like for entering a different debit or credit card number issued by and/or an account number provided by the different service provider 108, for entering a URL or other address of the different service provider 108, for entering instructions to use the different service provider 108, or the like depending on a type of repeating event and/or a type of the different service provider 108), an instruction for submitting information associated with the different service provider 108 (e.g., a button to press, a link to click, or the like), and/or other instructions or information, using which the event migration modules 104a may access and download a user's event data, migrate a repeating event, or the like.

In a further embodiment, one or more event migration modules 104a may pass messages to each other, such as instructions for accessing a server 108 of a service provider 108 (e.g., to aggregate event data, to migrate a repeating event, or the like) using a user's credentials, or the like, in a peer-to-peer manner. In another embodiment, a central entity, such as a backend event migration module 104b, may initially seed one or more sets of instructions for accessing a server 108 of a third party service provider 108 using a user's credentials to one or more event migration modules 104a, and the one or more event migration modules 104a may send the one or more sets of instructions to other event migration modules 104a.

Instructions for accessing a user's event data and/or for migrating a repeating event to a different service provider 108, however, in certain embodiments, may change over time, may vary for different users of a service provider 108, or the like (e.g., due to upgrades, different service levels or servers 108 for different users, acquisitions and/or consolidation of different third party service providers 108, or the like), causing certain instructions to fail over time and/or for certain users, preventing an event migration module 104 from aggregating a user's event data and/or migrating a repeating event. A backend event migration module 104b, in one embodiment, may provide one or more event migration modules 104a with a hierarchical list of multiple sets of instructions, known to have enabled access to a user's event data from a server 108 of a service provider 108 and/or migration of a repeating event to a different service provider 108. An event migration module 104a on a hardware device 102 may try different sets of instructions in hierarchical order, until the event migration module 104a is able to access a user's event data, migrate a repeating event, or the like.

An event migration module 104, in certain embodiments, may provide an interface to a user allowing the user to repair or fix failed instructions for accessing the user's event data and/or migrate a repeating event, by graphically identify an input location for the user's electronic credentials, an instruction for submitting a user's electronic credentials, a location of event data associated with the user, an input location for information of a different service provider 108, an instruction for submitting the information of the different service provider 108, or the like. An event migration module 104, in one embodiment, may highlight or otherwise suggest (e.g., bold, color, depict a visual comment or label, or the like) an estimate which the event migration module 104 has determined of an input location for the user's electronic credentials, an instruction for submitting a user's electronic credentials, a location of event data associated with the user, an input location for information of a different service provider 108, an instruction for submitting the information of the different service provider 108, or the like. For example, an event migration module 104 may process a web page of a server 108 of a service provider 108 (e.g., parse and/or search a hypertext markup language (HTML) file) to estimate an input location for the user's electronic credentials, an instruction for submitting a user's electronic credentials, a location of event data associated with the user, an input location for information of a different service provider 108, an instruction for submitting the information of the different service provider 108 or the like.

The one or more event migration modules 104, in certain embodiments, may provide an interface (e.g., an API, GUI, CLI, or the like) to provide downloaded and/or aggregated event data from servers 108 of one or more third party service providers 108 to one or more other entities (e.g., a remote server 110 or other hardware device 102 unaffiliated with the third party service provider 108, a backend event migration module 104b, or the like). The interface, in one embodiment, comprises a private interface between event migration modules 104a of users' hardware devices 102 and one or more backend event migration modules 104b. For example, this may enable a backend event migration module 104b to provide a user with access to downloaded and/or aggregated event data and/or to prompt a user to migrate a repeated event at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded event data from an event migration module 104 to one or more other tools, services, and/or other entities to store, process, and/or otherwise use the data.

In various embodiments, an event migration module 104 may be embodied as hardware, software, or some combination of hardware and software. In one embodiment, an event migration module 104 may comprise executable program code stored on a non-transitory computer readable storage medium for execution on a processor of a hardware device 102, a backend server 110, or the like. For example, an event migration module 104 may be embodied as executable program code executing on one or more of a hardware device 102, a backend server 110, a combination of one or more of the foregoing, or the like. In such an embodiment, the various modules that perform the operations of an event migration module 104, as described below, may be located on a hardware device 102, a backend server 110, a combination of the two, and/or the like.

In various embodiments, an event migration module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an event migration module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an event migration module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an event migration module 104.

An event migration module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an event migration module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an event migration module 104.

The semiconductor integrated circuit device or other hardware appliance of an event migration module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an event migration module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more service providers 108, in one embodiment, may include one or more network accessible computing systems such as one or more web servers hosting one or more web sites, an enterprise intranet system, an application server, an application programming interface (API) server, an authentication server, or the like. The one or more service providers 108 may include systems related to various institutions or organizations. For example, a service provider 108 may include a system providing electronic access to a financial institution, a university, a government agency, a utility company, an email provider, a social media site, a photo sharing site, a video sharing site, a data storage site, a medical provider, a SaaS provider, a software publisher, a subscription media provider (e.g., a streaming and/or downloadable audio, video, and/or e-book provider), an e-commerce website, and/or another entity providing a service associated with one or more repeating events. A service provider 108 may allow users to create user accounts associated with one or more repeating events (e.g., uploads, purchases, transactions, subscription events, data backup events, antivirus scans and/or updates, or the like). Accordingly, a service provider 108 may include an authorization system, such as a login element or page of a web site, application, API, or similar front-end, where a user can provide credentials, such as a username/password combination, to access the user's event data, to access services of the service provider 108, or the like.

An event migration module 104, in certain embodiments, may aggregate a set of events from one type of service provider 108 in order to identify and migrate repeating events for another type of service provider 108. For example, an event migration module 104 may aggregate financial transactions from one or more financial institution service providers 108 that have issued debit and/or credit cards to a user; where a user has a checking, savings, or other financial account; or the like in order to identify repeating events for one or more other types of service providers 108 (e.g., a SaaS provider, a software publisher, a subscription media provider, an e-commerce website, a merchant, a vendor, a mobile wallet provider, an antivirus provider, a utility company, an email provider, a social media site, a photo sharing site, a video sharing site, a data storage site, a medical provider, or the like). An event migration module 104 may use a first set of electronic credentials of a user to aggregate a set of events (e.g., directly and/or indirectly from one or more financial institutions to aggregate financial transaction data comprising financial transaction events) and, in response to identifying a repeated event, prompting a user to migrate the repeated event, and receiving authorization from the user accepting the prompt, the event migration module 104 may use a second set of electronic credentials of the user to migrate the repeated event to a different service provider 108 (e.g., using a user's electronic credentials for a streaming video service such as Netflix® to change the default payment source to a credit or debit card associated with a different financial institution service provider 108, or the like).

An event migration module 104 may be configured to process aggregated and/or downloaded event data to identify one or more repeating events. For example, an event migration module 104 may identify common and/or similar text strings in records for different instances of a repeating event (e.g., a text string associated with the same service provider 108), may identify a pattern in timing (e.g., time of day, day of the week, day of the month, day of the year, week of the year, month of the year, or the like) based on a timestamp or other date record for a repeating event, may correlate numerical values for different instances of a repeating event (e.g., the same value or within a threshold amount of the same value; the same monetary amount or within a threshold amount of the same monetary amount; or the like), may identify a similar event identifier and/or service provider 108 identifier (e.g., a name, URL or other address, or the like), may use artificial intelligence and/or machine learning to correlate event data into one or more repeating events, and/or may otherwise identify one or more repeating events.

A central event migration module 104b, in certain embodiments, may process aggregated sets of events for multiple users (e.g., each of a service provider 108's users, or the like) to identify repeating events and may dynamically target and/or select certain repeated events for certain users based on the aggregated sets of events. For example, in one embodiment, an event migration module 104 may determine whether or not to prompt a user to migrate a repeating event (e.g., subsequent instances of a repeating event identified in historical aggregated sets of event data) based on a likelihood that an aggregated set of events for the user includes each event for the user of an event type of the aggregated set of events (e.g., all or substantially all of a user's social media posts from all of the user's social media accounts, all or substantially all of a user's financial transactions from all of the user's financial accounts, or the like). In a further embodiment, instead of and/or in addition to being based on a likelihood that an aggregated set of events for the user includes each event for the user of an event type, an event migration module 104 may determine whether or not to prompt a user to migrate a repeating event to a different service provider 108 based on an estimated value to the different service provider 108 of migrating the repeating event (e.g., of migrating subsequent instances of the repeating event) based on values associated with the repeated event in the aggregated set of events for the user.

In one embodiment, an event migration module 104 selects a user for migrating a repeating event and/or selects a repeating event for migrating in response to the user's event data satisfying an event metric associated with the repeating event (e.g., associated by event type, by service provider 108, or the like). As used herein, an event metric may include a measurable or estimable quantity or unit of a repeating event that can be used to select a user and/or a repeating event for migrating to a different service provider 108. An event metric, in various embodiments, may include a lifetime value metric, a total spend metric, a transaction interval metric, an interest rate for a repeating event, a sum total spent on a repeating event, a price per repeating event, a monthly payment amount for a repeating event, a profit margin for a repeating event, a fee for a repeating event a geographical event metric, an income metric for a user associated with a repeating event, a savings metric associated with a repeating event, and/or the like.

An event metric, in one embodiment, comprises a lifetime value metric indicating a projected and/or estimated total value of a user to a different service provider 108 to which a repeating event is migrated (e.g., based on the user's aggregated set of events and/or on a cost of the migration to the different service provider 108), or the like. For example, an event migration module 104 may determine and/or estimate, based on a user's aggregated set of events, an amount the user is likely to spend on subsequent instances of the repeating event (e.g., based on previous costs and/or profits associated with the repeating event), how loyal a user is likely to be to the different service provider 108 after the migration (e.g., based on a determined amount of time the user has used the previous service provider 108, how often the user has previously migrated the repeating event, or the like), or the like, and may determine a lifetime value metric based on one or more of the foregoing determinations.

An event metric, in certain embodiments, comprises a total spend metric indicating a confidence of whether a user's aggregated set of events includes each of the user's events of an associated event type (e.g., each of the user's financial transactions from multiple financial institutions 108 for aggregated financial data, each of the user's social media posts from multiple social media networks 108 for aggregated social media data, or the like), aggregated from multiple entities (e.g., banks, credit unions, credit card companies or other lenders, payment processing companies, online payment providers, and/or the like for financial transaction events). If there is a low confidence or probability that an event migration module 104 has access to each of the user's events of a certain type (e.g., a complete and/or substantially complete financial snapshot for the user for aggregated financial transactions), it may be unlikely that an event migration module 104's determination of whether the user's financial transaction data satisfies an event metric associated with a repeating event is accurate, and a new service provider 108 may therefore find the user a poor candidate for the migrating the repeating event, due to the uncertainty of whether the user's aggregated event data is complete. Conversely, if there is a high confidence or probability that an event migration module 104 has access to each of a user's events for the user of an event type (e.g., a complete and/or substantially complete financial snapshot for the user for aggregated financial transactions), a new service provider 108 may have greater trust in an event migration module 104's selection of the user, and may prompt the user to migrate the repeating event with greater certainty.

An event migration module 104, in certain embodiments, may analyze and/or process a user's aggregated set of events using one or more rules, flags, indicators, and/or the like, to determine a total spend metric indicating a confidence of whether the user's aggregated set of events includes each of the user's events of an event type (e.g., over a predefined period). For example, in one embodiment, an event migration module 104 may start at a default confidence level (e.g., 50%, 0.5, 0%, 0, 100%, 1, or the like) and may adjust the confidence level for a user's aggregated set of events based on one or more confidence factors. An event migration module 104, in certain embodiments, may decrease a confidence level if one event in an event pair (e.g., two events that are often seen together within a predefined period) is missing, may increase a confidence level if both events in an event pair are present, or the like. For example, an event pair may include a mortgage payment and a utility payment; a payment credit on a credit card statement and a corresponding debit from a bank account; a car payment and fuel purchases; and/or another event pair.

In a further embodiment, an event migration module 104 may increase a confidence level of a total spend metric if one or more predefined key events are present, and/or may decrease a confidence level of a total spend metric if one or more predefined key events are not present in the aggregated set of events for a user. A key event, in one embodiment, comprises an event that is expected to occur for each user within a predefined period. For example, a key event may comprise a direct deposit and/or payroll check deposit, a mortgage and/or rent payment, at least a threshold amount spent on a personal necessity (e.g., food), and/or another expected event or transaction. In certain embodiments, an event migration module 104 may be configured to prompt a user to add one or more additional accounts for one or more additional service providers 108 in response to determining a confidence level below a threshold for a total spend metric for the user. In another embodiment, an event migration module 104 may query a user whether the user's aggregated set of events includes each of the user's events for an event type, and may base a confidence level of a total spend metric on the user's answer.

An event migration module 104, in one embodiment, may determine a confidence level of a total spend metric and/or another event metric by processing users' aggregated set of events using one or more predefined rules, or the like. In a further embodiment, an event migration module 104 may determine a confidence level of a total spend metric and/or another event metric dynamically, using machine learning or other artificial intelligence, or the like, causing an accuracy of an event migration module 104's determinations to increase over time (e.g., at least up to a point) as an event migration module 104 learns from and detects patterns in the aggregated set of events.

A geographical event metric, in various embodiments, may indicate, based on a user's aggregated event data, a geographical location of a user, of a repeating event, of a current service provider 108 for a repeating event, or the like. A geographic region, in certain embodiments, may comprise a street, a development, a district, a city, a county, a state, and/or another identifiable geographic area.

An event metric, in one embodiment, may comprise an income metric indicating a user's income (e.g., monthly, yearly, by source, gross income, disposable income, and/or the like). In a further embodiment, an event metric may comprise a savings metric indicating an amount of money a user saves (e.g., balance of a savings account; balance of an investment account; aggregated total of several savings and/or investment accounts; total amount saved; amount saved over a time period such as daily, weekly, monthly, and/or yearly; a rate of saving; and/or the like).

An event metric, in one embodiment, comprises a consistency metric indicating an amount of variation in spending for different events in a series of repeating events. An event metric, in certain embodiments, may comprise a transaction interval metric indicating an amount of time spanned by a user's aggregated set of events (e.g., one month, two months, three months, six months, a year, two years, three years, and/or the like). For example, in one embodiment, a new service provider 108 for a long term or high valued repeating event, may prefer to prompt one or more users with a higher transaction interval metric (e.g., with a longer amount of time spanned by the users' aggregated set of events), while a new service provider 108 for a smaller value repeating event, may not have such a preference and my prompt users with a lower transaction interval metric (e.g., with a shorter amount of time spanned by the users' aggregated set of events).

In certain embodiments, an event migration module 104 may provide an interface (e.g., a graphical user interface (GUI), an application programming interface (API), a command line interface (CLI), and/or the like) for an administrator or other user associated with a service provider 108 to set one or more thresholds whereby a user's aggregated set of events may satisfy an event metric for migrating a repeating event to the service provider 108. By setting one or more thresholds whereby a user's aggregated set of events may satisfy an event metric, a service provider 108 may target certain users for migrating repeating events based on the users' history of events. An event migration module 104, in one embodiment, may allow a service provider 108 to select a cap and/or a minimum on a number of users that will receive a prompt to migrate a repeating event, to adjust one or more thresholds of an event metric until at least a minimum number of users are selected, and/or the like.

In one embodiment, the one or more backend servers 110 and/or one or more backend event migration modules 104*b* provide central management of a network of event migration modules 104*a* for multiple users and/or hardware devices 102. For example, the one or more backend event migration modules 104*b* and/or a backend server 110 may store downloaded event data for the event migration modules 104*a* centrally, may provide instructions for the event migration modules 104*a* to prompt a user to migrate a repeating event, or the like. A backend server 110 may include one or more servers located remotely from the hardware devices 102 and/or the one or more service providers 108. A backend server 110 may include at least a portion of an event migration module 104, may comprise hardware of an event migration module 104, may store executable program code of an event migration module 104 in one or more non-transitory computer readable storage media, and/or may otherwise perform one or more of the various operations of an event migration module 104 described herein in order to migrate one or more repeating events to a different service provider 108.

Once an event migration module 104 has migrated a repeating event to a different service provider 108, the event migration module 104 may aggregate a subsequent set of events from the one or more servers 108 and may verify whether subsequent instances/occurrences of the repeating event remain migrated to the different service provider 108 in the subsequent set of events (e.g., using a similar analysis to that described above to determine whether the different service provider 108 is still performing the repeating event, or if the user has switched to another service provider 108). An event migration module 104 may re-prompt the user to migrate additional subsequent instances of the repeating event to the different service provider 108 if one or more of the subsequent instances of the repeating event have not remained migrated to the different service provider 108 (e.g., are no longer being performed/executed by the different service provider 108).

If a user denies or rejects a prompting to migrate a repeating event to a different service provider 108, an event migration module 104 may iteratively and/or periodically re-prompt the user to migrate subsequent instances of the repeating event to the different service provider (e.g., until the user accepts a prompt and migrates the repeating event). In certain embodiments, an event migration module 104 may include an offer or other incentive to the user in a prompt, such as a discount on a cost of the repeating event, a rebate, a certain number of points, a coupon, a gift card, or the like. When iteratively re-prompting a user, an event migration module 104 may increase a value of an offer with each iteration, or the like.

In one embodiment, the event migration module 104 receives a user's electronic credentials for a third party service provider 108 from the user on a hardware device 102 of the user. In a further embodiment, the event migration module 104 may receive electronic credentials for a different user (e.g., from a different hardware device 102, from a backend event migration module 104, or the like), which may be encrypted and/or otherwise secured, so that an event migration module 104 may download data for the different user (e.g., downloading data for multiple users from a single user's hardware device 102).

For example, in the distributed/decentralized system 100, if one user's hardware device 102 is turned off, asleep, out of battery, blocked by a third party service provider 108, or the like, in certain embodiments, an event migration module 202 on a different user's hardware device 102 and/or on a backend server 110 may download data for the one user, using the one user's electronic credentials, and may send the data to the one user's hardware device 102, may send an alert and/or push notification to the one user's hardware device 102, or the like. In this manner, in one embodiment, a user may continue to aggregate data, receive alerts and/or push notifications, or the like, even if the user's own hardware device 102 is blocked, unavailable, or the like. In cooperation with one or more authentication modules 202, the event migration modules 104*a*, 104*b*, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an event migration module 104 comprises hardware (e.g., a semiconductor integrated circuit device such as an FPGA, an ASIC, or the like), the event migration module 104 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the event migration module 104 may store and/or process electronic credentials, downloaded data, and/or other sensitive data in a secure and/or encrypted way using software and/or hardware of a user's existing hardware device 102 (e.g., encrypting data in RAM, NAND, and/or other general purpose storage) with or without dedicated security hardware. In certain embodiments, the event migration module 104 may encrypt and/or secure data (e.g., electronic credentials, downloaded data) associated with a first user that is received by, processed by, and/or stored by a second (e.g., different) user's hardware device 102 (e.g., from the first user's hardware device 102 over the data network 106 or the like), preventing the second user from accessing the first user's data while still allowing the first user's data to be downloaded and/or aggregated from a different user's hardware device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the event migration module 104 may authenticate and/or validate an identity of and/or an authorization of a user.

The event migration module 104, in certain embodiments, may receive different credentials from a user for different accounts of the user with different third party service providers 108 (e.g., different social networks, different photo sharing sites, different financial institutions) so that the event migration module 104 may download, aggregate, and/or combine the user's data from the multiple different third party service providers 108. In one embodiment, as described below with regard to the security module 302 of FIGS. 3 and 4, the event migration module 104, instead of and/or in addition to receiving one or more passwords or other electronic credentials from a user, may manage and/or determine one or more passwords or other electronic credentials for a user for one or more third party service providers 108. For example, in certain embodiments, the event migration module 104 may receive an initial set of electronic credentials (e.g., a username and a password) from a user for an account of the user with a third party service provider 108, and the event migration module 104 may use the initial set of electronic credentials to access the user's account with the third party service provider 108 to set a new password, determined by the event migration module 104. The event migration module 104, in one embodiment, may determine passwords or other electronic credentials that are more secure than those typically created by and/or memorable to a user (e.g., longer, more numbers, greater variation between capital and lowercase letters, more frequently changed, or the like).

In one embodiment, an event migration module 104 accesses one or more servers 108 of one or more third party service providers 108, from a hardware device 102 of a user and/or from a backend server 110, using a user's electronic credentials from the event migration module 104 (e.g., for the user associated with the hardware device 102, for a different user, or the like). An event migration module 104, in certain embodiments, downloads data associated with a user (e.g., a user's social media posts, a user's photos, a user's financial transactions, or the like) from one or more servers 108 of one or more third party service providers 108 to a hardware device 102 of a user (e.g., of the user associated with the downloaded data, of a different user for processing and/or for transfer to the hardware device 102 of the user associated with the downloaded data, or the like) and/or to a backend server 110 associated with an event migration module 104, instead of or in addition to downloading the data directly to a hardware device 102 of the user (e.g., based on an availability of the hardware device 102 of the user, to back up the data in a second location, or the like).

An event migration module 104, in certain embodiments, may use a webpage interface of a server 108 of a third party service provider 108 to access the server 108 using a user's electronic credentials and/or to download data associated with the user. For example, in certain embodiments, an event migration module 104 may download/load a webpage from a server 108 of a third party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling an event migration module 104 to access a server 108 (e.g., a location or method for submitting electronic credentials, or the like).

In response to successfully authenticating with and accessing a server 108 of a third party service provider 108 with a user's electronic credentials, an event migration module 104 may download data associated with the user (e.g., from a user's account or the like) from the server 108, to a hardware device 102 associated with the user, to a backend server 110, to a hardware device 102 of another user downloading the data in proxy for the user, or the like. As described below, in certain embodiments, the instructions may be received and/or provided for enabling an event migration module 104 to download data associated with a user from a server 108 of a third party service provider 108 (e.g., a URL or other link to a location for the data, a label or other identifier for locating the data within one or more webpages or other data structures, or the like). An event migration module 104, in certain embodiments, may follow instructions to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, an event migration module 104 sends or otherwise submits electronic credentials and/or receives or otherwise downloads data using an API or other access protocol of a server 108 of a third party service provider 108. For example, an event migration module 104 may send a request in a format specified by and/or compatible with a server 108 (e.g., an API server 108) of a third party service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or an event migration module 104 may use a different access protocol of a server 108.

In response to a request for data from an event migration module 104 (e.g., in response to an event migration module 104 authenticating a user using an access protocol of a server 108), a server 108 of a third party service provider 108 may send and/or return data associated with a user (e.g., in one or more messages, packets, payloads, as a URL or other pointer to a location from where an event migration module 104 may retrieve the data, or the like). An event migration module 104, in various embodiments, may receive data associated with a user directly from a server 108 of a third party service provider 108 over a data network 106; may receive a pointer, URL or other link to a location of data associated with a user from a server 108 of a third party service provider 108; may receive data associated with a user from another entity on a data network 106 (e.g., in response to a request from the server 108 of the third party service provider 108 to the other entity or the like); or may otherwise receive data associated with a user according to an access protocol of a third party service provider 108.

In one embodiment, a third party service provider 108 provides an event migration module 104 with an API or other access protocol. In a further embodiment, an event migration module 104 may act as a wrapper for and/or a plugin or extension of, an application of a third party service provider 108 (e.g., a mobile application), and the application may have access to an API or other access protocol of the third party service provider 108. In another embodiment, an event migration module 104 may be configured to use an API or other access protocol in a same manner as an application of a third party service provider 108 (e.g., a mobile application), through observation of the application of the third party service provider 108 or the like. In certain embodiments, an event migration module 104 may cooperate with an application of a third party service provider 108, a web browser through which a user accesses services of a third party service provider 108, or the like to access data associated with a user (e.g., accessing data already downloaded by an application and/or user, accessing a database or other data store of an application and/or web browser, scanning and/or screen scraping a web page of a third party service provider 108 as a user accesses the web page, or the like).

An event migration module 104, in certain embodiments, may access different third party service providers 108 in different manners. For example, a first third party service provider 108 may grant an event migration module 104 with access to an API or other access protocol, while an event migration module 104 may use a web page interface (e.g., screen scraping) to access and download data from a second third party service provider 108, or the like. In one embodiment, a remote backend server 110 may be associated with a first party service provider 110 (e.g., a vendor and/or provider of an event migration module 104) and an event migration module 104 may download data associated with a user from both the first party service provider 110 and from one or more third party service providers 108, aggregating the data together so that the user may access the data in a single interface and/or application. For example, as described below with regard to the event migration module 104, the event migration module 104 may provide a user access to the user's photos from multiple third party cloud storage providers 108 within a single photo application, may provide a user with access to the user's personal financial information within a single personal financial management application and/or online banking application, may provide a user with access to posts from multiple social networks within a single social networking application, or the like.

An event migration module 104, in certain embodiments, may store downloaded and/or aggregated data independently from the one or more third party service providers 108. For example, an event migration module 104 may store a user's downloaded and/or aggregated data on a hardware device 102 of the user, on a backend server 110 accessible by the user, or the like. In this manner, in certain embodiments, a user may control and/or access the user's data, even if a third party service provider 108 closes down or is not available, may use the user's data in any manner desired by the user even if the use is not supported by a third party service provider 108, or the like.

An event migration module 104, in one embodiment, in addition to and/or instead of downloading data from one or more third party service providers 108, may upload data to and/or change one or more settings of one or more third party service providers 108, in response to user input or the like. For example, in embodiments where the data comprises photos, an event migration module 104 may upload a photo from a hardware device 102 of the user to one or more third party service providers 110 (e.g., a downloaded photo that the user has edited on the hardware device 102 or the like). In embodiments where the data comprises social media posts or other content, an event migration module 104 may receive input from a user (e.g., a photo, a textual post, one or more emoji, a video, a document or other file, or the like) and upload the received input to one or more third party service providers 108 (e.g., social media sites or the like). In embodiments where the data comprises financial transactions or other financial data, an event migration module 104 may schedule a bill pay or other payment or funds transfer, remotely deposit a check (e.g., by uploading photos of the front and/or back of the check, or the like), and/or perform another action.

An event migration module 104 may update or change a user's account information with a third party service provider 108, such as an account type or plan, credit card or other payment information associated with an account, a phone number or address or other contact information associated with an account, a password or other electronic credentials for an account, and/or other account information of a user for a third party service provider 108. An event migration module 104 may update and/or upload data in a substantially similar manner to that described herein for downloading data (e.g., determining a user's electronic credentials for a third party service provider 108, accessing a server 108 of the third party service provider 108, uploading and/or providing data to the third party service provider 108, or the like).

In one embodiment, the event migration module 104 provides a user's data downloaded by an event migration module 104, from a hardware device 102 of a user (e.g., of the user associated with the downloaded data, of a different user) to another entity, such as a hardware device 102 of a user associated with the downloaded data (e.g., in response to the data being downloaded by a hardware device 102 of a different user, from one hardware device 102 of a user to another hardware device 102 of the same user), a remote server 110 or other remote device 102 unaffiliated with (e.g., not owned by, operated by, controlled by, or the like) the third party service provider 108 from which the data was downloaded, or the like. For example, the event migration module 104 may provide an API or other interface to provide a user's downloaded and/or aggregated data to a hardware device 102 of the user, to a backend event migration module 104b, to a backend server 110, to a different third party service provider 108, to a different/second hardware device 102 of the user, or the like.

In certain embodiments, it may be transparent and/or substantially transparent to a user (e.g., not apparent) which hardware device 102, 110 has downloaded data associated with the user. For example, the event migration module 104 may provide downloaded data associated with a user from one hardware device 102 of the user to another hardware device 102 of the user, from a hardware device 102 of the user to a backend server 110 (e.g., from which the user may access the data using a web browser, an application, or the like), from a backend server 110 to a hardware device 102 of the user, or the like, allowing the user to access the data from a different location than the location to which the data was downloaded.

In certain embodiments, the event migration module 104 provides a graphical user interface (GUI) on a hardware device 102 of a user, and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The event migration module 104, in various embodiments, may provide a GUI to the user from the same hardware device 102 to which the data was downloaded, on a different hardware device 102 than the hardware device 102, 110 to which the data was downloaded, or the like.

For example, in one embodiments, where the data associated with a user comprises photos, the event migration module 104 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the event migration module 104 may provide a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the event migration module 104 may provide a GUI comprising a stream, feed, and/or wall of social media posts for the user to view (e.g., downloaded and/or aggregated social media posts from multiple social networks 108, from different contacts or friends of the user, or the like).

The event migration module 104, in certain embodiments, may provide one or more access controls to a user, allowing the user to define which devices 102, users, third party service providers 110, or the like may access which data. For example, the event migration module 104 may provide an interface for a user to allow and/or restrict certain mobile applications, certain APIs for third party services, certain plugins or extensions, certain users, certain hardware devices 102, and/or one or more other entities to access data downloaded for the user from one or more third party service providers 108 (e.g., with access controls by third party service provider 108 or other data source, by data type, by entity requesting access, and/or at another granularity). In this manner, the event migration module 104, in certain embodiments, may comprise a local repository of aggregated data, which one or more other devices 102 and/or services may access and use, with a user's permission.

Figure 2:
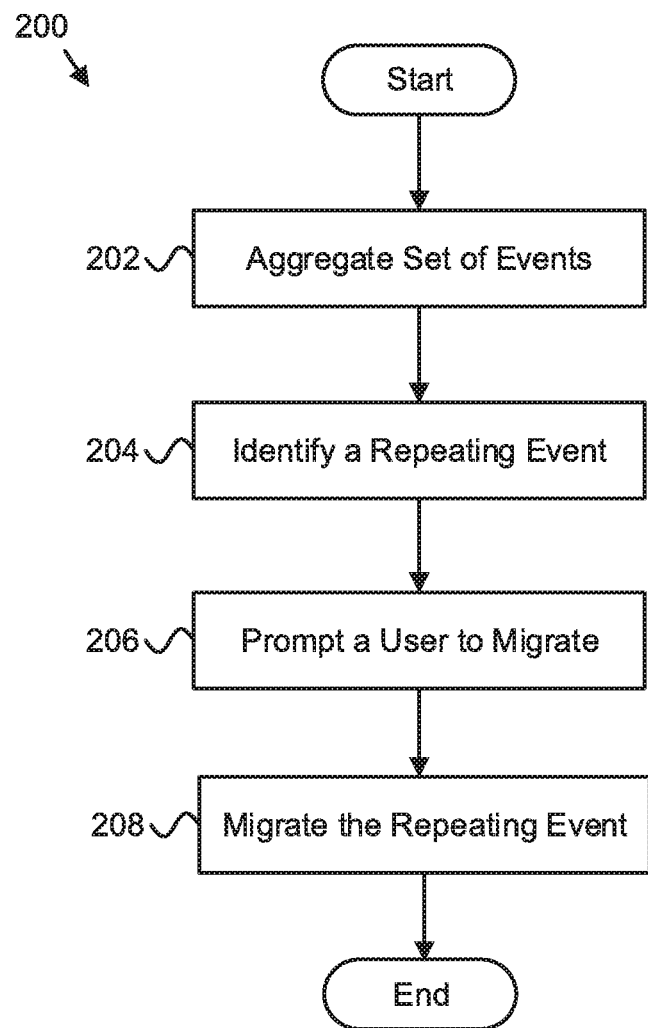
FIG. 2 is a schematic flow chart diagram illustrating one embodiment of a method for automatic account protection.

FIG. 2 depicts one embodiment of a method 200 for automated event migration. The method 200 begins and an event migration module 104 aggregates 202 a set of events from one or more servers 108 to a trusted hardware device 102 and/or 110, different events of the set of events being associated with different service providers 108. An event migration module 104 identifies 204, on the trusted hardware device 102 and/or 110, a repeating event from the set of events. An event migration module 104 prompts 206 a user to migrate subsequent instances of the repeating event from one service provider 204 to a different service provider 208 of the plurality of service providers 208. An event migration module 104 migrates 208 the subsequent instances of the repeating event, using the user's electronic credentials, from the one service provider 108 to the different service provider 108 in response to the user accepting the prompting 206 and the method 200 ends.

Figure 3:
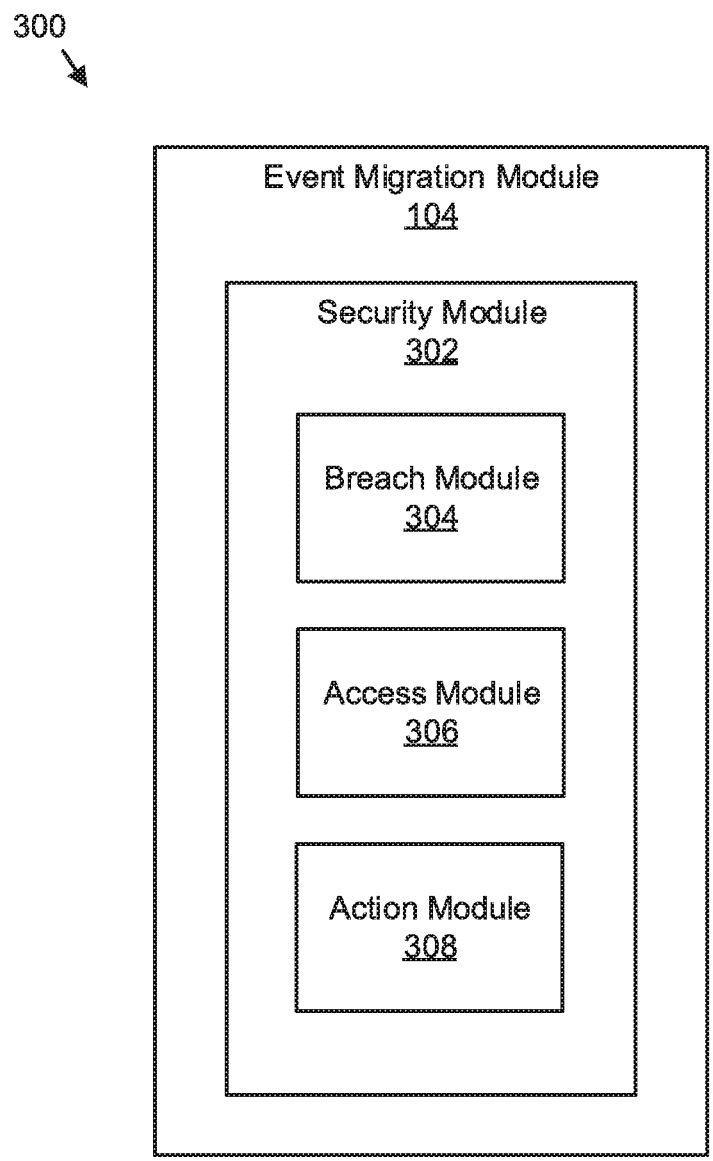
FIG. 3 is a schematic block diagram illustrating one embodiment of an event migration module that includes an instance of a security module.

FIG. 3 depicts one embodiment of a module 300 for automatic account protection. In one embodiment, the module 300 includes an instance of an event migration module 104, which includes an instance of a security module 302. The security module 302, in certain embodiments, includes one or more of a breach module 304, an access module 306, and an action module 308, which are described in more detail below. In some embodiments, at least a portion of the security module 302 is located on a backend server 110 (e.g., an aggregation server), a user's hardware device 102, and/or some combination of both.

The security module 302, in one embodiment, is configured to detect a security breach at one or websites where the user has an account, automatically login to the one or more websites where the security breach was detected (and other websites that may be compromised as a result of the security breach), and take various actions to protect the user's account with minimal to no effort or input on the part of the user. The security module 302 does this using the electronic credentials that are stored on the trusted hardware device for each of the websites, e.g., which may be used for aggregating data from each of the websites.

The breach module 304, in one embodiment, is configured to detect a trigger indicating one or more of a potential and an actual security breach at one or more websites where a user has an account that is accessible using electronic credentials. The one or more websites may include websites associated with financial institutions, email services, streaming services, service providers, work or school accounts for the user, medical institutions, and/or other websites that provide access to the user's account, which may include sensitive information such as personally identifying information ("PIT"), electronic credential information, financial account information, and/or the like.

As used herein, a security breach may refer to an incident that results in the unauthorized access of a user's account, data, applications, services, and/or the like. An actual security breach may include a security breach where it can be confirmed that a user's account was illegitimately accessed, e.g., based on changed data for the account, based on the user confirming that he/she did not access the account at a time when it was accessed, and/or the like. A potential security breach may refer to a security breach that cannot be confirmed as unauthorized access to the user's account, but there may be activity related to the user's account that is indicative of a security breach, e.g., detecting access to the user's account from an unknown device, from an unrecognized location, and/or the like.

In one embodiment, the trigger that the breach module 304 detects that is indicative of a potential or actual security breach includes detecting a login to the user's account from one of an unknown device, an unknown location, and an unknown internet protocol address; identifying activity associated with the user's account since the last login; identifying changes in the user's account information that were not initiated by the user; receiving one or more electronic messages (e.g., emails, text messages, push notifications, and/or the like) from the one or more websites that indicate a possible security breach; and/or the like.

In one embodiment, the access module 306, in response to the security breach, is configured to automatically login to the one or more websites for the user (e.g., on behalf of the user) using the electronic credentials. For instance, the access module 306 may retrieve the user's electronic credentials from the trusted hardware device and may use the electronic credentials to login to one or more websites where the user has an account that was associated with the security breach. The access module 306 may also use the electronic credentials to login to other websites where the security breach may not have been detected to proactively respond to the security breach and secure the user's account at the other websites before a security breach occurs at those websites.

In one embodiment, the access module 306 logs into the one or more websites using the electronic credentials using an application programming interface ("API") provided by the one or more websites, by scraping an interface for the one or more websites to locate fields where the user's credentials can be inputted, and/or the like. In such an embodiment, the electronic credentials may comprise a username and password, biometric information, a token, a passphrase, a code, an image, a voice signature, and/or the like.

In one embodiment, the action module 308 performs one or more actions, described in more detail below, associated with the electronic credentials to protect the user's accounts at the one or more websites. The one or more actions may include automatically changing/updating the user's electronic credentials, sending notifications to the user, changing payment sources, canceling payment cards, locking the user's accounts, enabling secondary, supplemental, or additional security features, and/or the like. In this manner, the security module 302 can proactively, and with little to no user input, protect, strengthen, and make more secure the user's accounts at various websites in response to an actual or potential security breach, security risk, data breach, and/or the like based on previously stored electronic credentials that are typically used for aggregating financial and other information for the user from the various websites.

Figure 4:
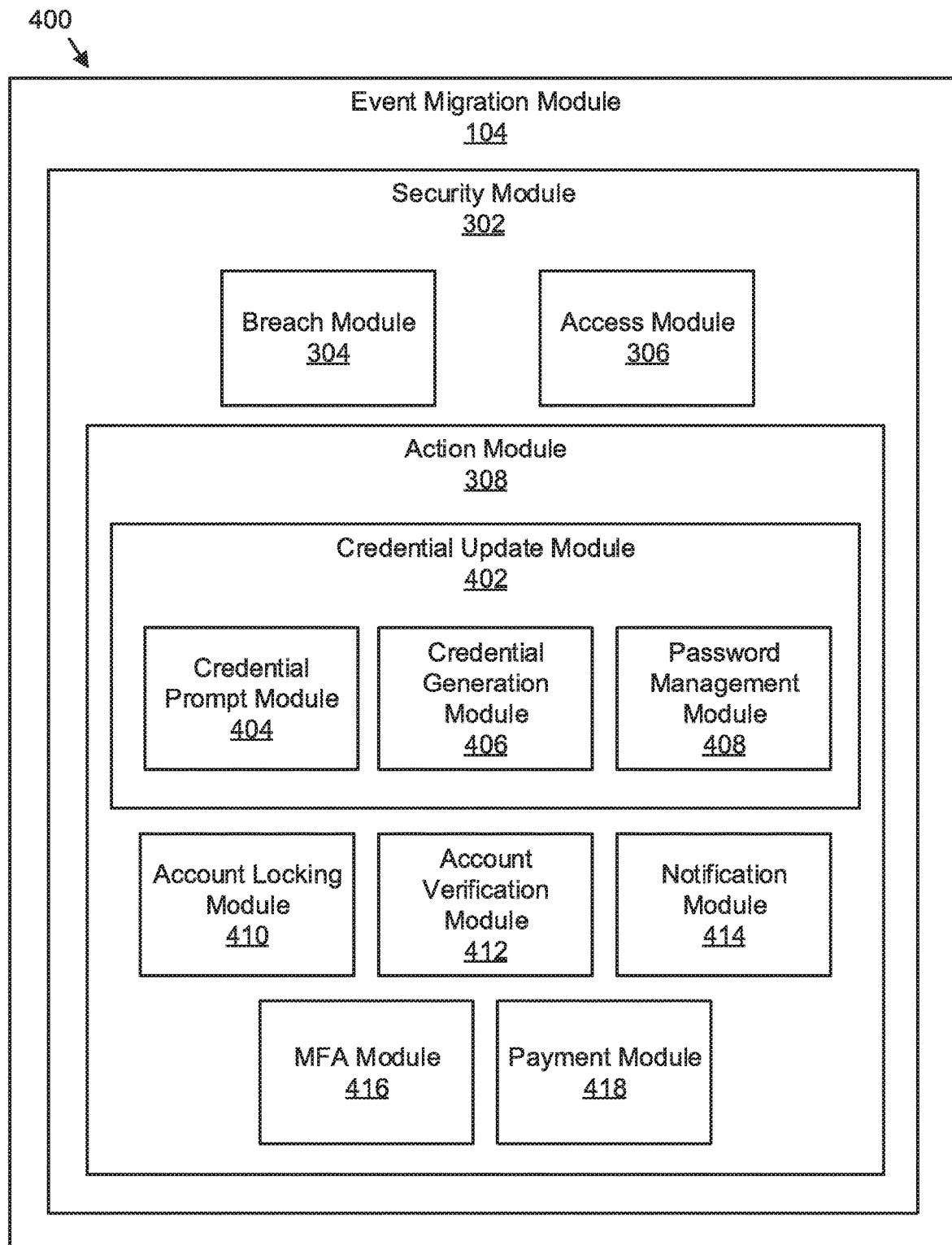
FIG. 4 is a schematic block diagram illustrating one embodiment of another event migration module that includes an instance of a security module.

FIG. 4 depicts one embodiment of a module 400 for automatic account protection. In one embodiment, the module 400 includes an instance of an event migration module 104, which includes an instance of a security module 302. The security module 302, in certain embodiments, includes one or more of a breach module 304, an access module 306, and an action module 308, which may be substantially similar to the breach module 304, the access module 306, and the action module 308 described above with reference to FIG. 3. In further embodiments, the action module 308 includes a credential update module 402 that includes one or more instances of a credential prompt module 404, a credential generation module 406, and a password management module 408. In some embodiments, the action module 308 also includes instances of an account locking module 410, an account verification module 412, a notification module 414, an MFA module 416, and a payment module 418, which are described in more detail below.

The credential update module 402, in one embodiment, is configured to locate one or more user interface elements associated with the electronic credentials on the one or more websites and automatically change the electronic credentials for the user at the one or more websites using the one or more interface elements. For instance, after the access module 306 accesses the user's account on the website, the credential update module 402 may scrape the website to locate interface elements that can be used to change the user's electronic credentials such as links, text field, password fields, buttons, and/or the like that are associated with or otherwise used to update user credential information. For example, the credential update module 402 may scrape, parse, search, crawl, or the like a website for a password field, (e.g., by scraping text data on the website, by parsing HTML tags, or the like) that can be used to reset or change the user's password.

In such an embodiment, the credential prompt module 404 prompts the user's for new electronic credentials for the one or more websites prior to the credential update module 402 changing the electronic credentials at each of the one or more websites. For example, the credential prompt module 404 may send a prompt to the user via email, text message, push notification, or the like to provide a new username, password, biometric information, token, or the like that the credential update module 402 can use for changing the electronic credentials at the websites. The credential prompt module 404 may prompt for new credentials for each of the websites that are affected by the security breach, or at each website that the access module 306 has stored credentials for regardless of whether the website was part of the security breach or not, which may prevent unauthorized access at other websites that have not been breached yet.

In further embodiments, the credential prompt module 404 and/or the credential generation module 406, described below, checks or verifies the strength of the new electronic credentials. For instance, the credential prompt module 404 may receive password information from the user and may verify that the password information conforms to predefined password guidelines or rules (e.g., that the password has a certain length, contain certain characters, and/or the like). In some embodiments, if the credentials do not meet the predefined guidelines, the credential prompt module 404 may provide suggestions or examples of credentials that do meet the guidelines such as password recommendations that the user can select or use in generating new electronic credentials.

In one embodiment, the credential generation module 406 is configured to generate random electronic credentials for changing the electronic credentials at each of the one or more websites. For example, the credential generation module 406 may generate random passwords that conform to predefined password policies and use the passwords to automatically update the user's credentials at the one or more websites without prompting or asking the user for input prior to changing the passwords. In this manner, the security module 302 can react to a security breach by automatically changing the user's credentials without having to wait for a user to provide new credentials or other input.

In such an embodiment, the credential generation module 406 generates new electronic credentials for each of the one or more websites affected by the security breach, and/or for other websites that may have been affected but it cannot be confirmed, so that the same new credentials are not used for each website, which may prevent future security breaches if the user fails to change the credentials and the credentials are misappropriated.

In one embodiment, after the credential update module 402 changes the electronic credentials using the randomly generated electronic credentials that the credential generation module 406 generates, the credential prompt module 404 may prompt the user for new electronic credentials so that the user can specify their own credentials that conform to the password guidelines. Thus, in this manner, the credential update module 402 reacts to a security breach by resetting the user's credentials using randomly generated credentials to prevent further unauthorized access to the user's accounts and then prompt the user for new credentials.

In one embodiment, the password management module 408 is configured to update a password manager for the user with the changed electronic credentials for the one or more websites where the user has an account. As used herein, a password manager refers to an application that generates, stores, and retrieves passwords that a user submits to access different accounts. The password manager may be embodied as a locally installed application, an online service accessed through website portals, local accessed hardware devices that serve as keys, and/or the like. Examples include Dashlane® and LastPass®. In certain embodiments, password managers store multiple different electronic credentials for different websites, applications, services, or the like and protect access to the credentials using a master credential, e.g., a master password.

Thus, in one embodiment, the password management module 408 retrieves the master credential (e.g., in response to user input, based on a previous access of the master credential, or the like) and accesses the password manager, e.g., using an API to automatically update or change the credentials for each of the websites where the credential update module 402 updated or changed the credentials for the user's account with the new electronic credentials. In this manner, the user is not required to manually update each credential in the password manager.

In one embodiment, the account locking module 410 is configured to lock the user's account at each of the one or more websites such that the user is required to provide new electronic credentials to access the account. In such an embodiment, the account locking module 410 sends a command or request to lock the user's account so that the user, or other users who may have breached the account, cannot access the account without resetting the credentials. In order to reset the credentials, the user may need to provide verification or identification information.

In one embodiments, the account verification module 412 is configured to provide stored personally identifying information ("PII") to the one or more websites to verify the user's identity for unlocking the user's account in response to a request for the PII from the one or more websites. The PII may include answers to security questions, unique user identification data (e.g., social security numbers, PIN numbers, or the like), device identification information (e.g., if the account is tied to a particular device or hardware), and/or the like. The PII may be used to unlock the user's account after the account locking module 410 sent a request to lock the account.

In one embodiments, the notification module 414 is configured to notify the user of the security breach at the one or more websites where the user has an account. The notification may include an electronic notification such as a text message, an email, a push notification, a social media message, an instant message or chat message, and/or the like. The notification may include information regarding the website where the breach was detected, the user account that was compromised, whether data was accessed or stolen, unauthorized activity that occurred using the user's account, and/or the like.

In one embodiment, the MFA module 416 is configured to enable multi-factor authentication for accessing the user's accounts at the one or more websites. As used herein, multi-factor authentication may refer to an authentication method in which a user is granted access to a user account only after successfully presenting two or more pieces of evidence to an authentication mechanism. The "evidence", for example, may include a username/password combination and a verification code that is sent to the user's device (based on a previously stored phone number).

The MFA module 416 may automatically enable multi-factor authentication for one or more of the user's accounts without further input from the user. The MFA module 416 may use previously stored identification information, such as a previously stored phone number for the user, to enable multi-factor authentication. Other factors may include biometric information, a token, a code, a key, a pass phrase, and/or the like, which may be available to the MFA module 416 for use in setting up multi-factor authentication for the user's accounts.

In one embodiment, the payment module 418 is configured to cancel one or more payment cards associated with the user's accounts in response to the security breach. The user's accounts, for instance, may include credit card accounts, bank accounts tied to a debit card, digital payment cards, and/or the like. To prevent unauthorized use of the payment cards, the payment module 418 may send a request to the one or more websites with a payment card to cancel the cards, lock the cards, suspend the cards, and/or the like.

For example, the payment module 418 may send a request to a bank where a security breach was detected to cancel a credit card and a debit card associated with the user's account.

Furthermore, in certain embodiments, the payment module 418 is configured to change a payment source for the one or more websites from a payment source associated with the user's account associated with the security breach to a different payment source for the user using the user's electronic credentials. In certain embodiments, the user's account where the security breach occurred may be used as a default payment source for online e-commerce sites (e.g. Amazon®, iTunes®, or the like), auto-pay accounts (e.g., automatic bill payments), repeating or subscription transactions (e.g., Netflix®, Hulu®, or the like), and/or the like. If the payment source is compromised or cancelled, the accounts being serviced with the payment source may not be paid and may be cancelled, may incur late fees, may send late payment information to a credit bureau, and/or the like.

In order to continue service at the accounts where the payment source is being used, the payment module 418 may automatically switch the payment source from the compromised account where the security breach occurred to a different payment source, e.g., a different bank account, a different credit card account, a different debit card, a different online payment source, or the like using the aggregated transaction data from the various institutions where the user has accounts. The payment module 418, for instance, may identify the accounts or services that are being paid using the payment source associated with the security breach, based on the aggregated transaction data, and may log into the accounts, locate the payment information (e.g., by scraping the website to locate interface elements for the payment information), and change the payment information to a different payment source. In this manner, the user's e-commerce accounts, auto-pay services, repeating services, subscription services, or the like can continue to be paid from a different payment source without requiring the user to manually configure the payment information.

In certain embodiments, the payment module 418 prompts the user to authorize the changing of the payment source to the different payment source prior to changing the payment source. The prompt may include a list of selectable different payment sources for the user. For example, the payment module 418 may present a list of repeating accounts (e.g., auto-pay accounts, subscription payments, or the like) that are being serviced from a payment source that is associated with the security breach, and a list of possible new payment sources to continue servicing the repeating accounts such as credit cards, debit cards, bank accounts, or the like that are not compromised from the security breach. The user may then select which repeating accounts to service with the selected payment accounts. In this manner, the user can quickly get an overview of which repeating accounts are affected by the security breach and specify other payment sources that can be used to continue servicing the repeating accounts.

In certain embodiments, the credential update module 402 updates the user's electronic credentials at the websites where the security breach was detected. If the credential update module 402 determines that the electronic credentials associated with the security breach are used at other websites that may not have been compromised as part of the security breach (e.g., the same password, both the same password and the same email address or other username, or the like), then the credential update module 402 may also change the electronic credentials (e.g., change the password, PIN, or the like) for the unaffected websites to prevent a future security breach using the compromised electronic credentials. On the other hand, if the electronic credentials for the user are different at the unaffected websites, but are associated with, affiliated with, make use of, or the like a compromised payment source such as a compromised credit card, bank account, debit card, digital payment source, or the like, then the payment module 418 may change the payment source for the unaffected websites to a different payment source, as described above but using the different electronic credentials, so that the unaffected websites no longer use the compromised payment source (e.g., allowing the user to cancel the compromised credit card, request a new credit card with a different credit card number, or the like, without interrupting a subscription or other service for other online accounts at different third party service providers using the same compromised credit card as a payment source).

For example, if the user's credit card information is stolen due to a security breach by one third party service provider for one of the user's online accounts, the payment module 418 may automatically change the payment source (e.g., from the stolen credit card information) for the user's other online accounts with different third party service providers, or the like to use a different payment source (e.g., a different credit card that wasn't part of the breach) even if the user uses different credentials to log into the other online accounts. In such an embodiment, the payment module 418 may log into each online account, using the aggregated electronic credential information for the user, determine whether each account is using the stolen credit card information from the security breach, and update the user's accounts that were using the stolen credit card information as a payment source with a different payment source, e.g., a different credit card, a different debit card, a different bank account, or the like, that was not compromised in the security breach.

Figure 5:
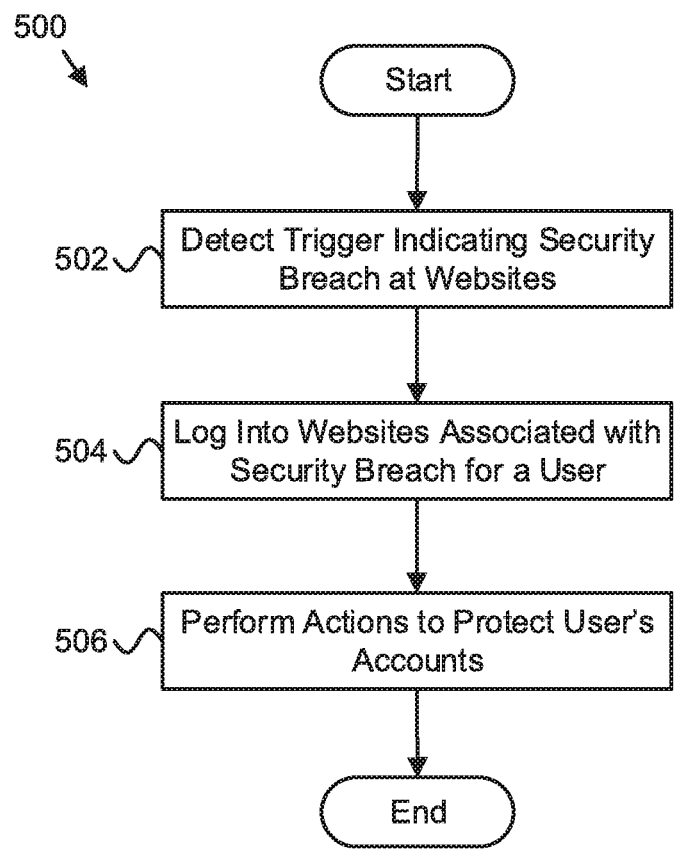
FIG. 5 is a schematic flow chart diagram illustrating another embodiment of a method for automatic account protection.

FIG. 5 depicts a schematic flow chart diagram for one embodiment of a method 500 for automatic account protection. In one embodiment, the method 500 begins and the breach module 304 detects 502 a trigger indicating one or more of a potential and an actual security breach at one or more websites where a user has an account that is accessible using electronic credentials. In further embodiments, the access module 306 logs 504 into the one or more websites for the user using the electronic credentials. In certain embodiments, the action module 308 performs 506 one or more actions at the one or more websites associated with the electronic credentials to protect the user's account, and the method 500 ends.

Figure 6:
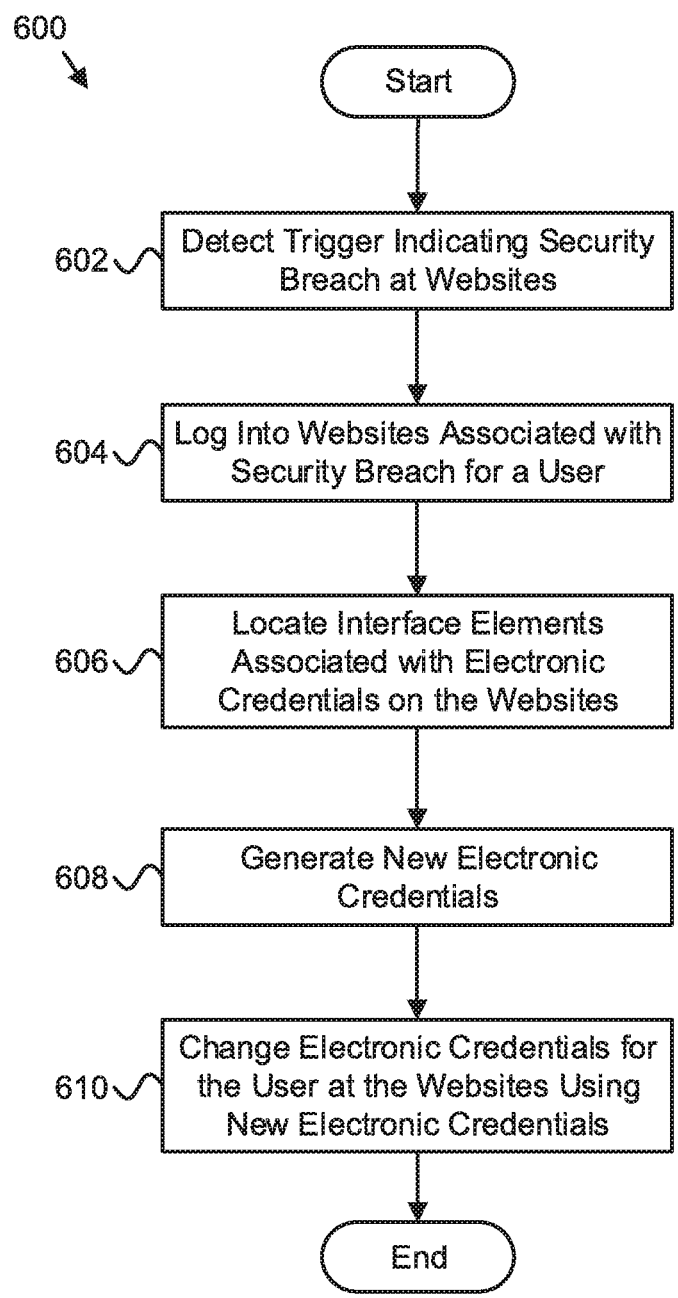
FIG. 6 is a schematic flow chart diagram illustrating another embodiment of a method for automatic account protection.

FIG. 6 depicts a schematic flow chart diagram for one embodiment of a method 600 for automatic account protection. In one embodiment, the method 600 begins and the breach module 304 detects 602 a trigger indicating one or more of a potential and an actual security breach at one or more websites where a user has an account that is accessible using electronic credentials. In further embodiments, the access module 306 logs 604 into the one or more websites for the user using the electronic credentials.

In some embodiments, the credential update module 402 locates 606 one or more user interface elements associated with the electronic credentials on the one or more websites. The credential generation module 406, in certain embodiments, generates 608 new random electronic credentials for changing the electronic credentials at each of the one or more websites. In one embodiment, the credential update module 402 changes 610 the electronic credentials for the user at the one or more websites using the one or more user interface elements and the randomly generated electronic credentials, and the method 600 ends.

Figure 7:
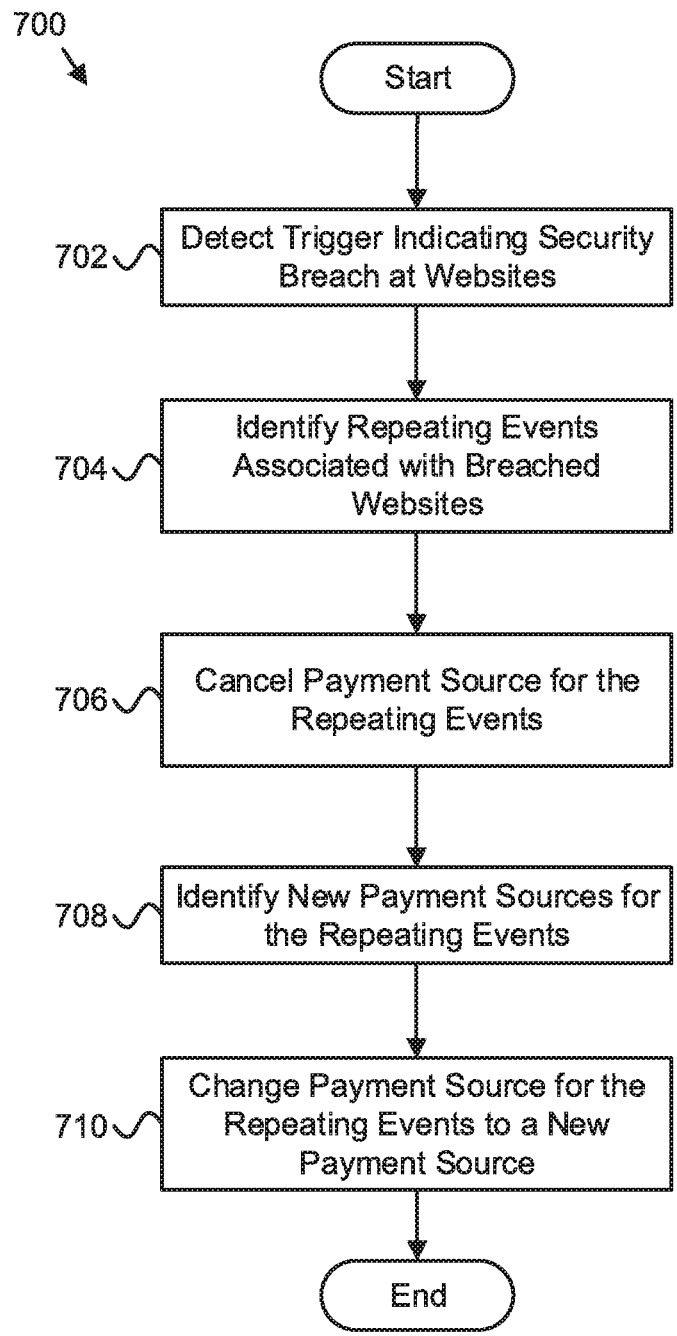
FIG. 7 is a schematic flow chart diagram illustrating another embodiment of a method for automatic account protection.

FIG. 7 depicts a schematic flow chart diagram for one embodiment of a method 700 for automatic account protection. In one embodiment, the method 700 begins and the breach module 304 detects 702 a trigger indicating one or more of a potential and an actual security breach at one or more websites where a user has an account that is accessible using electronic credentials. In one embodiment, the payment module 418 identifies (e.g., from the aggregated transaction data) 704 one or more repeating events associated with the breached websites, e.g., repeating events that are paid using accounts where a security breach was detected.

In certain embodiments, the payment module 418 cancels 706 the payment source for the repeating events, identifies 708 new payment sources that can be used to pay or service the repeating events (e.g., payment accounts that were not affected by the security breach), and automatically changes 710 the payment source for the repeating events from the old payment source, e.g., the payment source affected by the security breach, to the new payment source, and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting a trigger indicating one or more of a potential and an actual security breach at one or more websites where a user has an account that is accessible using electronic credentials;
   logging into the one or more websites for the user using the electronic credentials; and
   performing one or more actions at the one or more websites associated with the electronic credentials to protect the user's account, the one or more actions comprising:
   locating one or more user interface elements associated with the electronic credentials on the one or more websites;
   generating random electronic credentials for changing the electronic credentials at each of the one or more websites, wherein different electronic credentials are generated for each of the one or more websites;
   changing the electronic credentials for the user at the one or more websites to the random electronic credentials using the one or more user interface elements; and
   prompting the user for new electronic credentials for each of the one or more websites in response to changing the electronic credentials for the user at the one or more websites.

2. The method of claim 1, further comprising prompting the user for new electronic credentials for each of the one or more websites prior to changing the electronic credentials for the user at each of the one or more websites.

3. The method of claim 2, further comprising:
   checking the strength of the new electronic credentials; and
   suggesting one or more different electronic credentials in response to the strength of the new electronic credentials not satisfying a threshold strength.

4. The method of claim 1, wherein the one or more actions comprises updating a password manager for the user with the changed electronic credentials for the one or more websites where the user has an account.

5. The method of claim 1, wherein the one or more actions comprises locking the user's account at each of the one or more websites such that the user is required to provide new electronic credentials to access the account.

6. The method of claim 5, wherein the one or more actions comprises providing stored personally identifying information ("PII") to the one or more websites to verify the user's identity for unlocking the user's account in response to a request for the PII from the one or more websites.

7. The method of claim 1, wherein the one or more actions comprises notifying the user of the security breach at the one or more websites where the user has an account.

8. The method of claim 1, wherein the one or more actions comprises enabling multi-factor authentication for accessing the user's accounts at the one or more websites.

9. The method of claim 1, wherein the one or more actions comprises cancelling one or more payment cards associated with the user's accounts in response to the security breach.

10. The method of claim 1, wherein the one or more actions comprises changing a payment source for the one or more websites from a payment source associated with the user's account associated with the security breach to a different payment source for the user using the user's electronic credentials.

11. The method of claim 10, further comprising prompting the user to authorize the changing of the payment source to the different payment source prior to changing the payment source, the prompt including a list of selectable different payment sources for the user.

12. The method of claim 10, further comprising:
logging into a different website associated with the payment source that is associated with the security breach using different electronic credentials for the user, the different electronic credentials not associated with the security breach; and
changing a payment source for the different website from the payment source associated with the user's account associated with the security breach to the different payment source for the user.

13. The method of claim 1, wherein the trigger indicating one or more of the potential and actual security breach comprises one or more of:
detecting a login to the user's account from one of an unknown device, an unknown location, and an unknown internet protocol address;
identifying activity associated with the user's account since the last login;
identifying changes in the user's account information that were not initiated by the user; and
receiving one or more electronic messages from the one or more websites that indicate a possible security breach.

14. An apparatus comprising:
a breach module that detects a trigger indicating one or more of a potential and an actual security breach at one or more websites where a user has an account that is accessible using electronic credentials;
an access module that logs into the one or more websites for the user using the electronic credentials; and
an action module that performs one or more actions at the one or more websites associated with the electronic credentials to protect the user's account, the one or more actions comprising:
locating one or more user interface elements associated with the electronic credentials on the one or more websites;
generating random electronic credentials for changing the electronic credentials at each of the one or more websites, wherein different electronic credentials are generated for each of the one or more websites;
changing the electronic credentials for the user at the one or more websites to the random electronic credentials using the one or more user interface elements; and
prompting the user for new electronic credentials for each of the one or more websites in response to changing the electronic credentials for the user at the one or more websites.

15. The apparatus of claim 14, further comprising a prompt module that prompts the user for new electronic credentials for each of the one or more websites prior to changing the electronic credentials for the user at each of the one or more websites.

16. A computer program product comprising a computer readable storage medium storing computer usable program code executable to perform operations, the operations comprising:
detecting a trigger indicating one or more of a potential and an actual security breach at one or more websites where a user has an account that is accessible using electronic credentials;
logging into the one or more websites for the user using the electronic credentials; and
performing one or more actions at the one or more websites associated with the electronic credentials to protect the user's account, the one or more actions comprising:
locating one or more user interface elements associated with the electronic credentials on the one or more websites;
generating random electronic credentials for changing the electronic credentials at each of the one or more websites, wherein different electronic credentials are generated for each of the one or more websites;
changing the electronic credentials for the user at the one or more websites to the random electronic credentials using the one or more user interface elements; and
prompting the user for new electronic credentials for each of the one or more websites in response to changing the electronic credentials for the user at the one or more websites.

17. The apparatus of claim 14, wherein the one or more actions comprises changing a payment source for the one or more websites from a payment source associated with the user's account associated with the security breach to a different payment source for the user using the user's electronic credentials.

18. The apparatus of claim 17, wherein the one or more actions further comprises prompting the user to authorize the changing of the payment source to the different payment source prior to changing the payment source, the prompt including a list of selectable different payment sources for the user.

19. The apparatus of claim 17, wherein the one or more actions further comprises:
logging into a different website associated with the payment source that is associated with the security breach using different electronic credentials for the user, the different electronic credentials not associated with the security breach; and changing a payment source for the different website from the payment source associated with the user's account associated with the security breach to the different payment source for the user.

20. The computer program product claim 16, wherein the one or more actions comprises:

changing a payment source for the one or more websites from a payment source associated with the user's account associated with the security breach to a different payment source for the user using the user's electronic credentials;

logging into a different website associated with the payment source that is associated with the security breach using different electronic credentials for the user, the different electronic credentials not associated with the security breach; and changing a payment source for the different website from the payment source associated with the user's account associated with the security breach to the different payment source for the user.

* * * * *